United States Patent
Erk et al.

(10) Patent No.: US 7,753,967 B2
(45) Date of Patent: Jul. 13, 2010

(54) METHOD FOR CONVERTING PERYLEN-3,4:9,10-TETRACARBOXYLIC ACID DIIMIDES INTO A FORM SUITABLE FOR USE AS A FLUORESCENT DYE

(75) Inventors: Peter Erk, Frankenthal (DE); Simone Schaefer, Kleinfischlingen (DE); Arno Boehm, Mannheim (DE); Peter Blaschka, Ludwigshafen (DE); Harald Arms, Hohen-Suelzen (DE); Willi Helfer, Friedelsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 549 days.

(21) Appl. No.: 10/514,564

(22) PCT Filed: Jun. 6, 2003

(86) PCT No.: PCT/EP03/05937

§ 371 (c)(1),
(2), (4) Date: Jan. 31, 2005

(87) PCT Pub. No.: WO03/106566

PCT Pub. Date: Dec. 24, 2003

(65) Prior Publication Data

US 2005/0251930 A1  Nov. 17, 2005

(30) Foreign Application Priority Data

Jun. 12, 2002 (DE) .................. 102 26 181

(51) Int. Cl.
C09B 3/14 (2006.01)
C07B 63/00 (2006.01)

(52) U.S. Cl. ............................ 8/648; 546/37

(58) Field of Classification Search ............ 8/648, 8/438; 546/37
See application file for complete search history.

(56) References Cited

U.S. PATENT DOCUMENTS 3,792,051 A * 2/1974 Graser ................. 544/294
4,446,324 A * 5/1984 Graser ................. 546/37
4,588,814 A * 5/1986 Spietschka et al. ........ 546/37

FOREIGN PATENT DOCUMENTS

DE 30 16 765 11/1981
DE 30 49 215 7/1982
EP 0 055 363 7/1982

OTHER PUBLICATIONS

Rademacher, Andreas et al. "Loesliche Perylen-Fluoreszenzfarbstoffe mit hoher Photostabilitaet", Chem. Ber., vol. 115, pp. 2927-2934, with English abstract, XP000881309 1982.
Graser, Fritz et al. "Kristallstruktur und Farbe bei Perylen-3,4:9,10-bis(dicarboximid)-Pigmenten", Liebigs Ann. Chem., pp. 1994-2011, with English abstract, XP001070159 1980.
Seybold, G. et al. "New Perylene and Violanthrone Dyestuffs for Fluorescent Collectors", Dyes and Pigments, vol. 11, No. 4, pp. 303-317, XP009016080 1989.
Lee, Sang Kwon et al. "Electrochemistry, Spectroscopy and Electrogenerated Chemiluminescence of Perylene, Terrylene, and Quaterrylene Diimides in Aprotic Solution", J. Am. Chem. Soc., vol. 121, No. 14, pp. 3513-3520, XP002252150 1999.

* cited by examiner

*Primary Examiner*—Lorna M Douyon
*Assistant Examiner*—Amina Khan
(74) *Attorney, Agent, or Firm*—Oblon, Spivak, McClelland, Maier & Neustadt, L.L.P.

(57) ABSTRACT

Novel crystalline forms of and a process for converting perylene-3,4:9,10-tetracarboximide of the general formula I

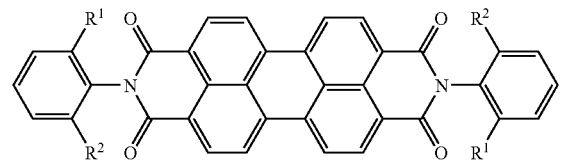

to a form used as a fluorescent dye. The process including: a) dissolving or suspending the perylene-3,4:9,10-tetracarboximide in a solvent to obtain a solution or suspension; and b1) cooling the solution obtained in step a) to a temperature at or below the crystallization temperature of the perylene-3,4:9, 10-tetracarboximide and, if the solvent is organic, removing excess solvent until the first crystals form, otherwise, adding water or dilute aqueous solutions of the solvent until the first crystals form, and maintaining the solution at that temperature for further crystallization; or b2) cooling the suspension obtained in step a) to or below the crystallization temperature when the temperature in step a) was above the crystallization temperature, and maintaining the suspension at the temperature for further crystallization to form one or more solvate crystals.

3 Claims, 6 Drawing Sheets

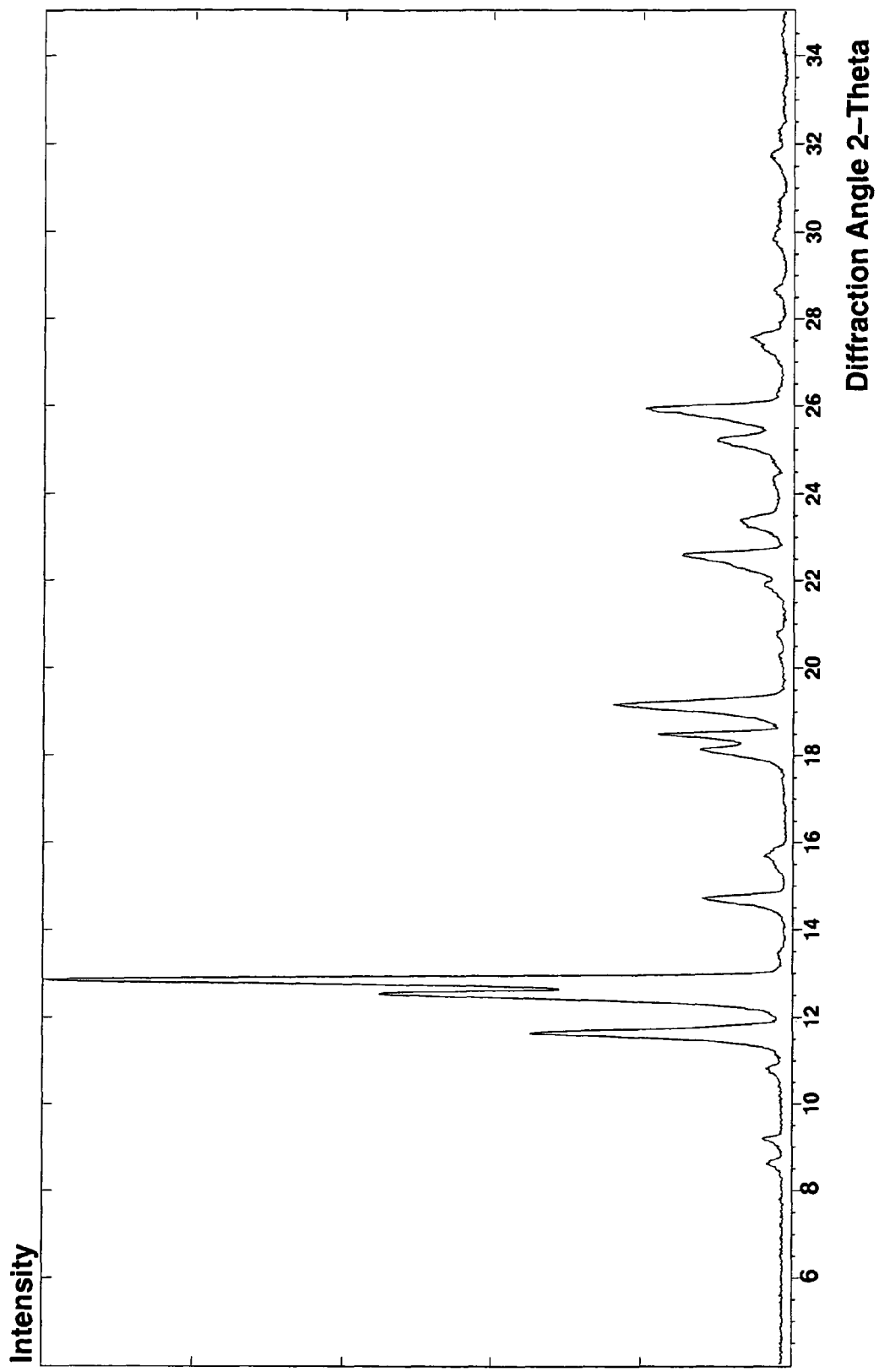
Figure No. 1

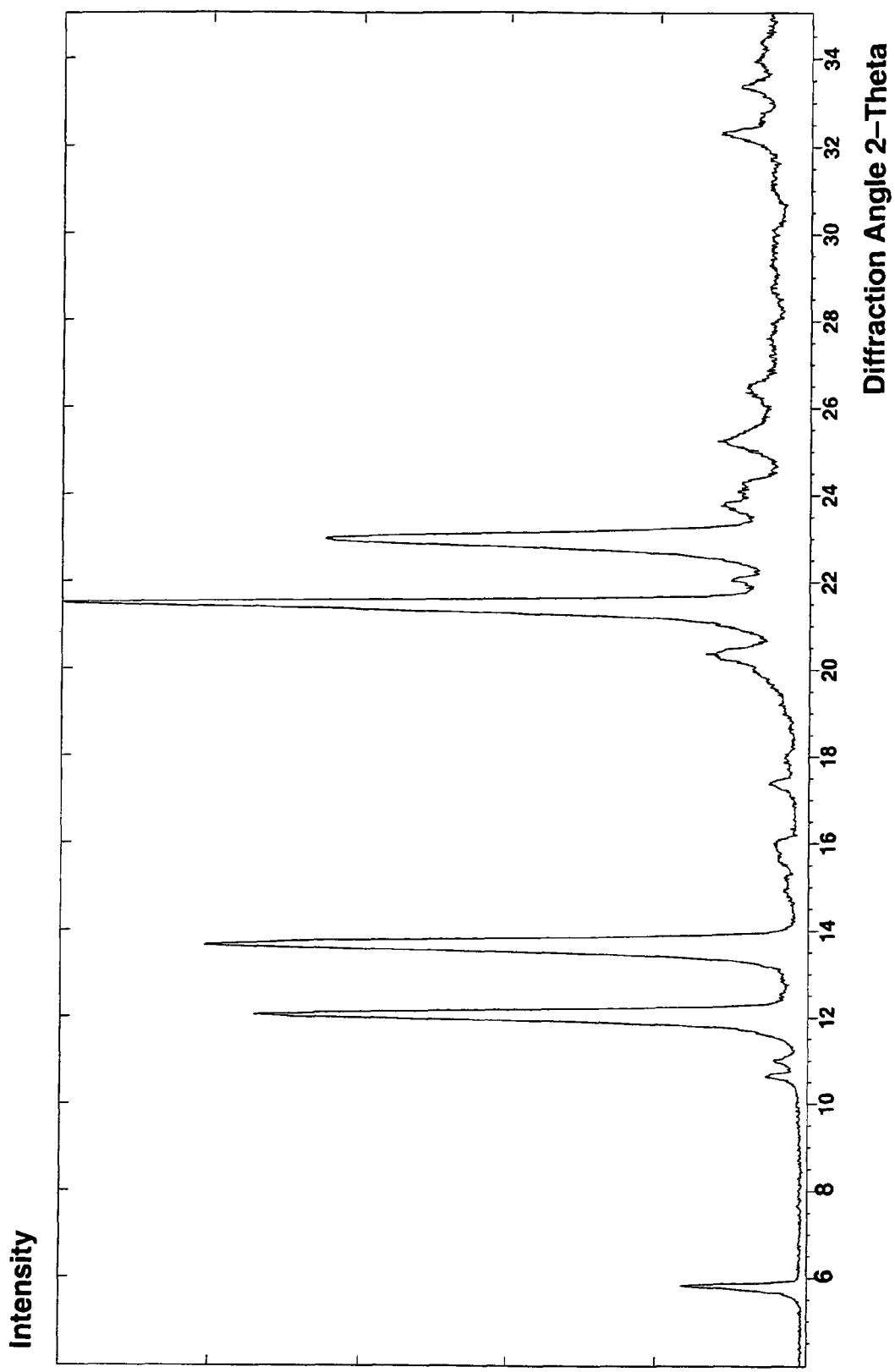
Figure No. 2

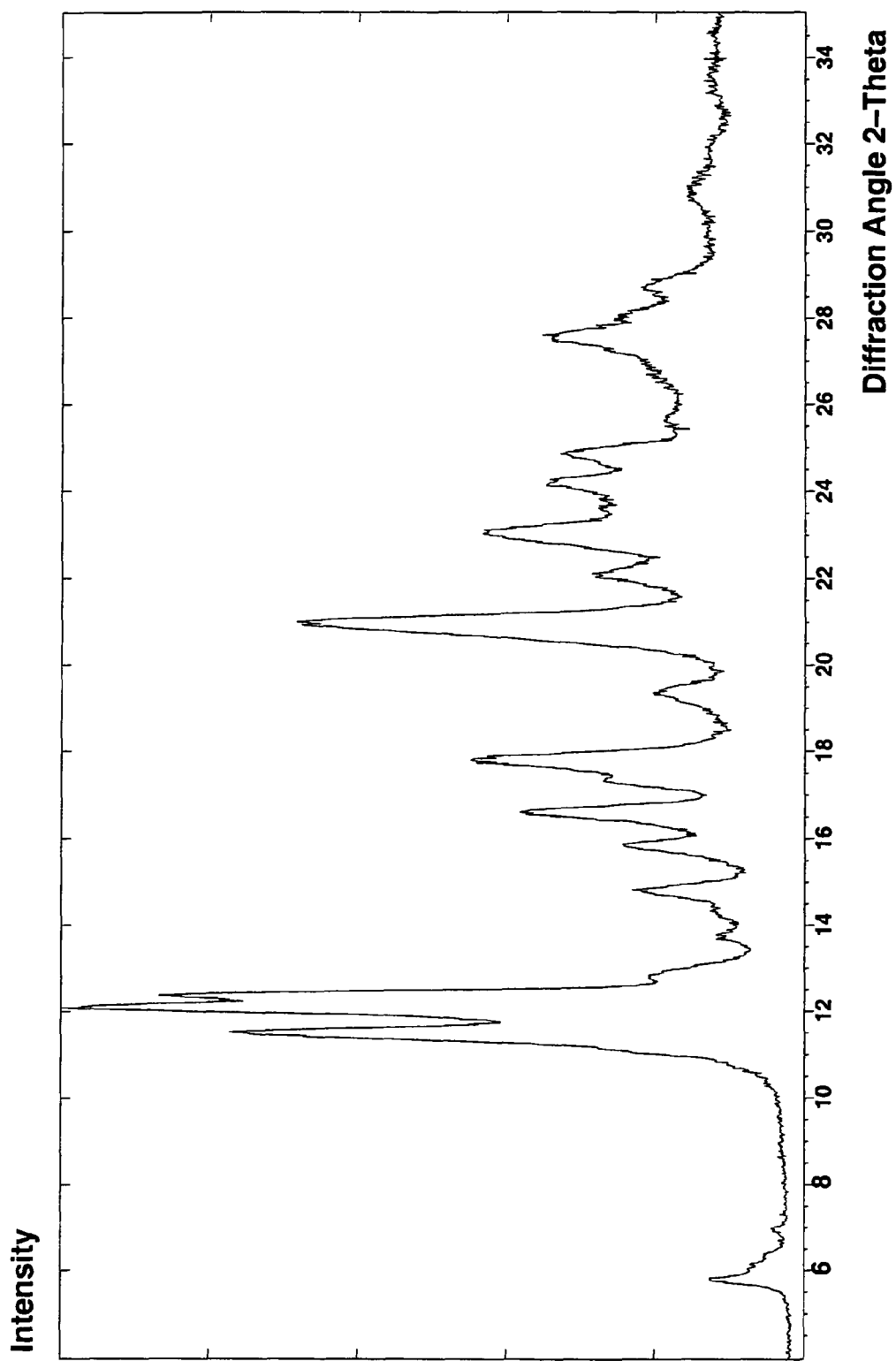
Figure No. 3

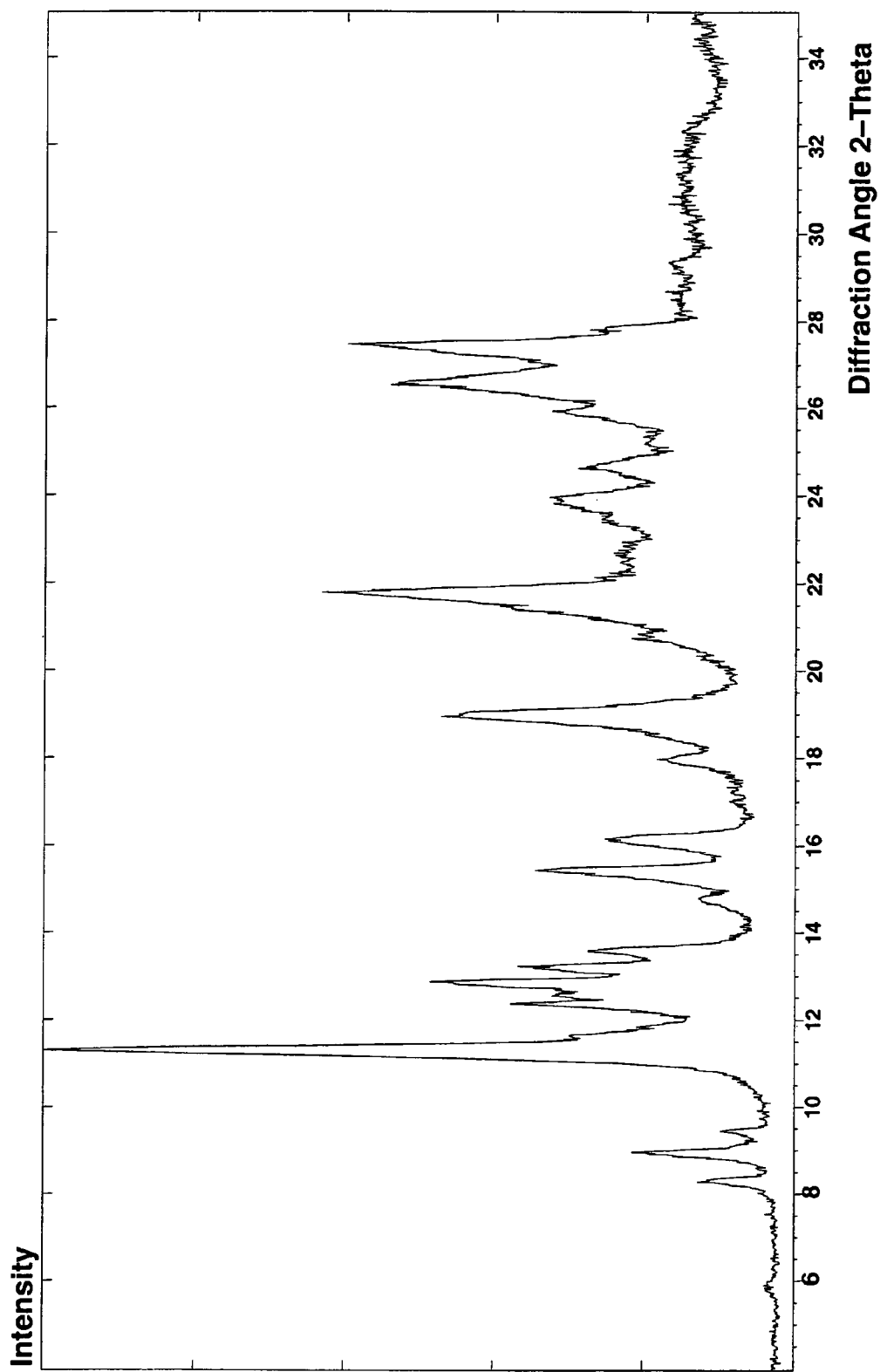
Figure No. 4

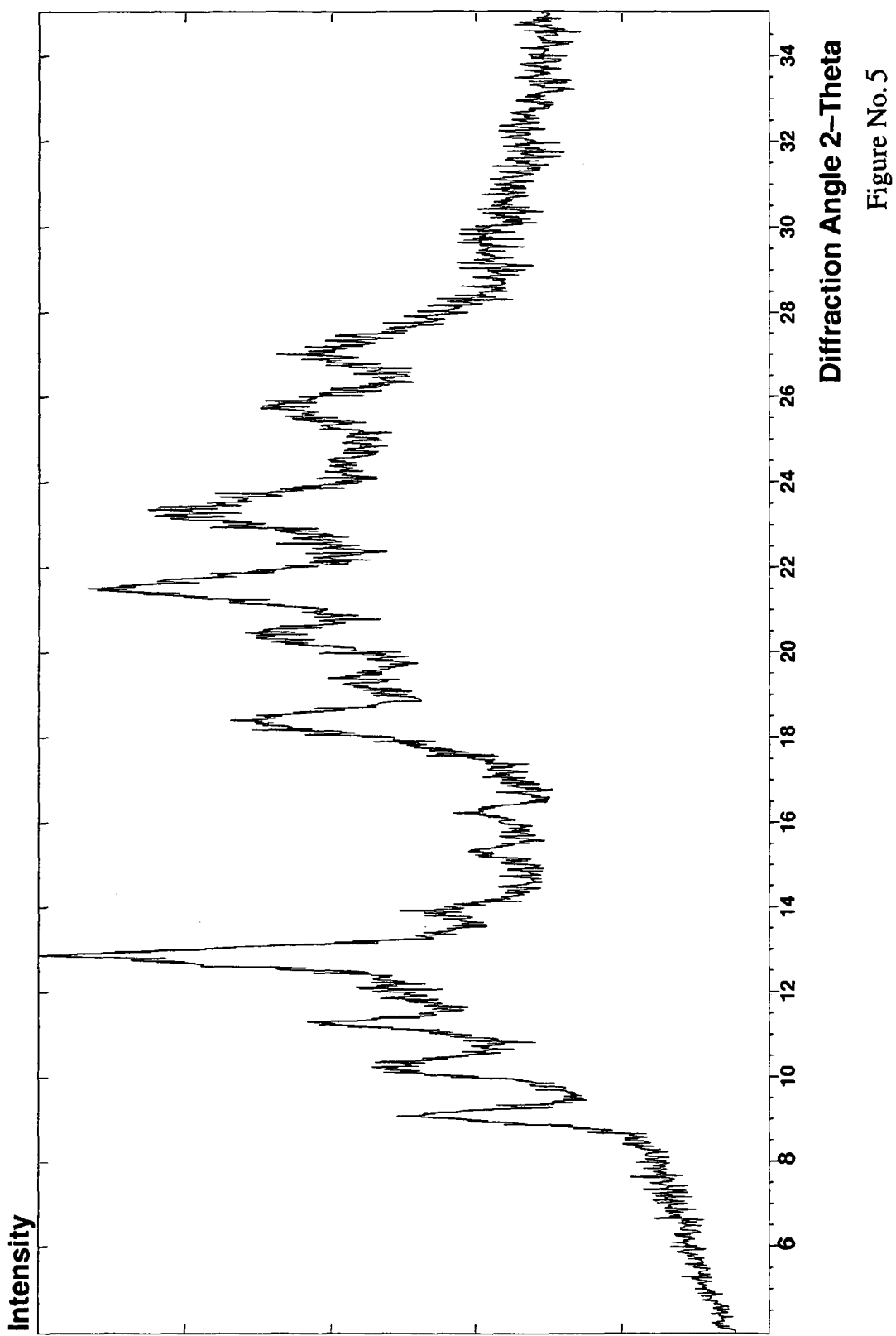
Figure No. 5

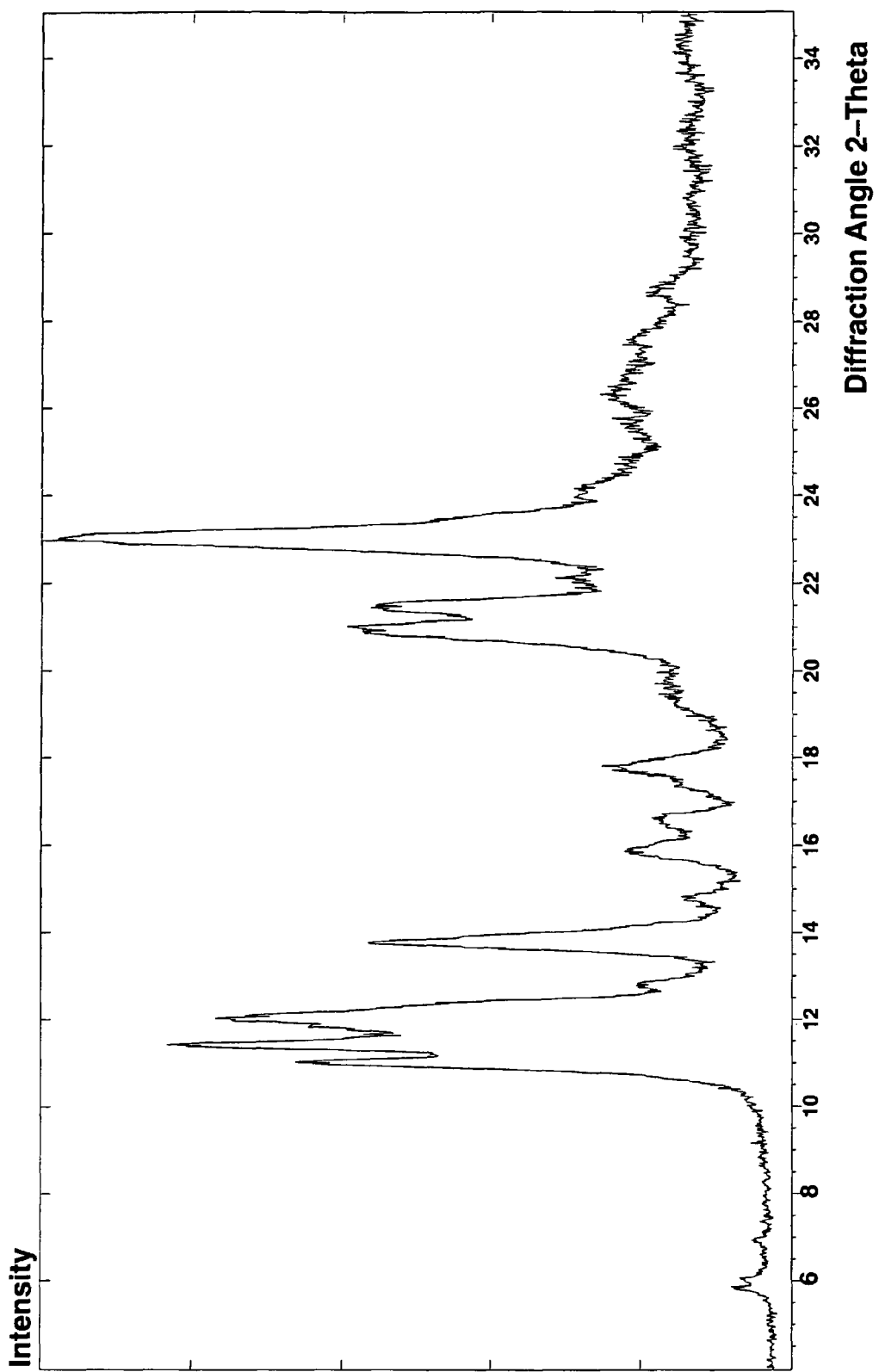
Figure No. 6

METHOD FOR CONVERTING PERYLEN-3,4:9,10-TETRACARBOXYLIC ACID DIIMIDES INTO A FORM SUITABLE FOR USE AS A FLUORESCENT DYE

CROSS REFERENCES TO RELATED APPLICATIONS

This application is a national stage application of International Patent Application No. PCT/EP03/05937, filed on Jun. 6, 2003, and claims priority to German Patent Application No. 102 26 181.4, filed on Jun. 12, 2002, both of which are incorporated herein by reference in their entireties.

The present invention relates to a novel process for converting perylene-3,4:9,10-tetracarboximides of the general formula I (referred to hereinbelow as "perylimides I" for short)

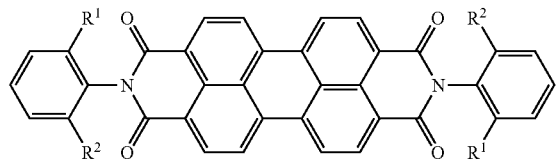

in which $R^1$ and $R^2$ are each unbranched, branched or cyclic $C_1$-$C_8$-alkyl, to a form suitable for use as fluorescent dyes.

The invention also relates to crystalline solvates of the perylimides I which contain 1 or 2 mol of solvent per mole of perylimide I.

The invention further relates to different crystalline forms of N,N'-bis(2,6-diisopropylphenyl)perylene-3,4:9,10-tetracarboximide which are characterized by X-ray powder diagrams (CuK$_\alpha$) having significant lines at the following d values:

Form A ("perylimide A"): 10.2, 9.60, 8.17, 7.60, 7.07, 6.89, 6.02, 5.64, 4.89, 4.79, 4.63, 3.93, 3.81, 3.53 and 3.43 Å;
Form B ("perylimide B"): 15.3, 7.68, 7.32, 7.15, 5.99, 5.59, 5.33, 4.98, 4.24, 3.86 and 3.235 Å;
Form C ("perylimide C"): 10.67, 9.88, 9.36, 7.82, 7.16, 6.89, 5.74, 5.49, 4.68, 4.085, 3.354 and 3.252 Å;
Form D ("perylimide D"): 9.7, 8.6, 7.85, 6.88, 4.83, 4.13 and 3.81 Å;
Form E ("perylimide E"): 15.2, 14.7, 8.04, 7.76, 7.36, 6.43, 5.59, 4.99, 4.25, 4.14 and 3.863 Å.

The invention relates not least to the use of the perylimides I and the perylimides A to E prepared according to the invention as fluorescent dyes for coloring organic and inorganic polymeric materials, and also as emitter materials in electrooptical components.

EP-A-55 363 describes various perylimides which are substituted on both imide nitrogen atoms by alkyl- or chlorine-substituted phenyl, including N,N'-bis(2,6-diisopropylphenyl)perylimide.

These perylimides are prepared by reacting perylene-3,4:9,10-tetracarboxylic dianhydride with the correspondingly substituted aniline in the presence of a zinc compound and sometimes also of acetic acid as a catalyst in quinoline. The perylimides are then precipitated by adding methanol, filtered off and washed with methanol and water. To remove unconverted perylene-3,4:9,10-tetracarboxylic dianhydride, the perylimides isolated in this way are usually then stirred in hot carbonate solution.

EP-A-55 363 proposes a further variant for isolating the perylimides in which the entire reaction mixture is initially brought into solution by adding a solvent which dissolves the perylimide, such as N-methylpyrrolidone, dimethylacetamide or dimethylformamide, and heating, the solution is filtered and the perylimide is precipitated out again by adding lower alcohols, such as methanol, optionally in a mixture with water. The perylimides should usually be obtained in a sufficiently pure form.

However, according to in-house investigations, this method of precipitation results only in products of insufficient purity being obtained which contain by-products, in particular N-substituted perylene-3,4-dicarboximide, in relatively large amounts (generally >10%), and are substantially X-ray-amorphous, and also finely crystalline and difficult to filter.

For further purification, EP-A-55 363 proposes reprecipitation from sulfuric acid and also recrystallization, without giving any further information.

It is an object of the present invention to provide a process which makes it possible to efficiently purify perylimides I and in which the perylimides I are obtained directly in a form suitable for use as fluorescent dyes.

We have found that this object is achieved by a process for converting perylene-3,4:9,10-tetracarboximides of the general formula I

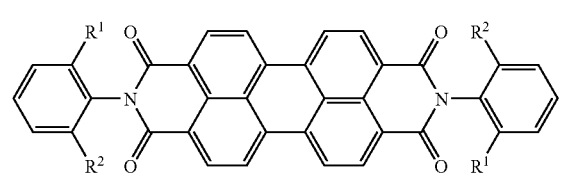

in which $R^1$ and $R^2$ are each unbranched, branched or cyclic $C_1$-$C_8$-alkyl to a form suitable for use as fluorescent dyes, which comprises
a) dissolving or suspending the perylene-3,4:9,10-tetracarboximides in an organic or inorganic solvent whose molecules have a molecular volume of $\leq 230$ Å$^3$ at from 0 to 250° C.,
b1) cooling the solution obtained in step a) to or below the crystallization temperature and, in the case of an organic solvent, if desired at the same time removing excess solvent until the first crystals form, or, in the case of an inorganic solvent, adding water or dilute aqueous solutions of the solvent until the first crystals form, and maintaining the solution at this temperature for further crystallization or
b2) cooling the suspension obtained in step a) to or below the crystallization temperature when the temperature in step a) was above the crystallization temperature, and maintaining the suspension at this temperature for further crystallization,
c) isolating the solvate crystals formed in step b) and
d) then removing the solvent from the solvate crystals.

It is essential to the process according to the invention that the solvent molecules used in step a) have a molecular volume of $\leq 230$ Å$^3$, preferably $\leq 200$ Å$^3$ and more preferably $\leq 180$ Å$^3$, and are therefore able to form stable binary crystal phases (solvates or else clathrates) with the perylimide I which contain up to 2 molecules of solvent per molecule of perylimide I.

The molecular volumes specified may be calculated from the structure of the molecule by the method published by Gavezzotti (*J. Amer. Chem. Soc.* 1989, 11, p. 1835).

Preference is given to using solvents in which the perylimide I dissolves, optionally after heating, although solvents may also be used in which the perylimide I only partially dissolves at the treatment temperature. The conversion to the corresponding solvates is then effected in suspension.

Accordingly, useful organic solvents are in particular (the term alkyl is also intended to encompass cycloalkyl, in particular cyclohexyl):

di-$C_1$-$C_4$-alkylsulfoxides, such as dimethyl sulfoxide; sulfolane;

unsubstituted and N—$C_1$-$C_6$-alkyl-substituted $C_4$-$C_6$-lactams, such as pyrrolidone, N-methylpyrrolidone, N-cyclohexylpyrrolidone, N-octylpyrrolidone, caprolactam and N-ethylcaprolactam;

unsubstituted and N—$C_1$-$C_6$-alkyl-substituted aliphatic $C_1$-$C_6$-carboxamides, such as formamide, dimethylformamide, dimethylacetamide, benzamide and N-acetylmorpholine;

aliphatic nitriles having from 2 to 12 carbon atoms, such as acetonitrile and 2-methoxypropionitrile;

aromatic nitriles which may be substituted by $C_1$-$C_8$-alkyl, $C_1$-$C_8$-alkoxy and/or halogen, such as benzonitrile and 3-methylbenzonitrile;

aliphatic $C_1$-$C_{12}$-carboxylic acids and their $C_1$-$C_6$-alkyl esters having a total number of carbon atoms of $\leq 12$, such as formic acid, acetic acid, propionic acid, 2-ethylhexanoic acid and ethyl acetate;

hydroxy-$C_2$-$C_6$-carboxylic acids and their esters, such as lactic acid, butyrolactone, valerolactone and caprolactone;

$C_2$-$C_6$-alkylene carbonates, such as ethylene carbonate and propylene carbonate;

benzoic acids, such as benzoic acid, phthalic acid and terephthalic acid;

naphthoic acids, such as α- and β-naphthoic acid;

$C_1$-$C_6$-alkyl benzoates, such as methyl benzoate and ethyl 3-methylbenzoate;

di-$C_1$-$C_2$-alkyl phthalates, such as diethyl phthalate;

monohydric and polyhydric, saturated and unsaturated, aliphatic and cycloaliphatic $C_4$-$C_{12}$-alcohols, such as butanol, isoamyl alcohol, cyclohexanol, octanol, 3-methyl-1-pentyn-3-ol, methoxypropanol, furfuryl alcohol, tetrahydrofurfuryl alcohol and 1,5-pentanediol;

araliphatic alcohols, such as benzyl alcohol, 2-phenylethanol and 4-methoxybenzyl alcohol;

mono- and oligo-$C_2$-$C_3$-alkylene glycol mono- and -di-$C_1$-$C_8$-alkyl- and monophenyl ethers, such as ethylene glycol monomethyl ether, ethylene glycol monobutyl ether, ethylene glycol monophenyl ether and diethylene glycol dimethyl ether;

aliphatic $C_3$-$C_{12}$-ketones, such as acetone, methyl isobutyl ketone, diacetone alcohol, cyclohexanone and 2-methylcyclohexanone;

aromatic ketones which may be substituted by $C_1$-$C_8$-alkyl, $C_1$-$C_8$-alkoxy and/or halogen, such as isophorone, acetophenone, propiophenone, 3-chloroacetophenone and 3-ethylacetophenone;

aliphatic and cycloaliphatic $C_4$-$C_{12}$-ethers, such as methyl tert-butyl ether, ethyl isobutyl ether, 2-ethylhexyl methyl ether, tetrahydrofuran and dioxane;

aromatic ethers which may be substituted by $C_1$-$C_8$-alkyl, $C_1$-$C_8$-alkoxy and/or halogen, such as diphenyl ether;

heterocycles, such as pyridine, picoline, lutidine, quinoline, methylquinoline, imidazole, methylimidazole and 1,3-dimethyl-2-imidazolidinone;

aromatic hydrocarbons which may be substituted by $C_1$-$C_8$-alkyl, $C_1$-$C_8$-alkoxy, $C_1$-$C_6$-alkylamino, di-$C_1$-$C_3$-alkylamino, chlorine and/or nitro, such as toluene, o-, m- and p-xylene, ethylbenzene, cumene, methoxybenzene, chlorobenzene, o-dichlorobenzene, 1,2,4-trichlorobenzene, nitrobenzene, phenol, 3-methylphenol, p-chlorophenol, o-nitrophenol, N-hydroxyethylaniline, 1,2,3,4-tetrahydronaphthalene, 2-chloronaphthalene, 2-methoxynaphthalene and dimethylnaphthalene;

aliphatic and cycloaliphatic $C_6$-$C_{18}$-hydrocarbons, such as limonene, decalin and methylcyclohexane;

chlorohydrocarbons, such as methylene chloride, chloroform, tetrachloromethane, dichloroethane, trichloroethane and tetrachloroethane.

It will be appreciated that mixtures of these solvents may also be used.

Preferred organic solvents are xylene, toluene, N-methylpyrrolidone, dimethylacetamide, dimethylformamide, methyl isobutyl ketone, methylene chloride, ethylene glycol monophenyl ether and ethylene glycol monobutyl ether.

It is also possible to use combinations of these solvents, i.e. to initially form a solvate with a first solvent (for example N-methylpyrrolidone) and to exchange the solvent in this solvate by treating with a second solvent (for example acetic acid).

Useful inorganic solvents are in particular acids, in particular sulfuric acid.

In step a) of the process according to the invention, the perylimide I is either dissolved in the solvent or suspended therein.

Accordingly, when organic solvents are used, the procedure in accordance with the invention may be as follows: a mixture of perylimide I and solvent is heated to a temperature at which the perylimide I dissolves in the solvent, the resulting solution is then cooled in step b1) to or below the crystallization temperature of the perylimide I and the solution is maintained at this temperature for further crystallization; the crystallization may, if desired, be promoted by at the same time removing excess solvent. Or the perylimide I is suspended in the solvent, preferably at elevated temperature, to increase the purifying effect, the resulting suspension is then cooled in step b2) to or below the temperature at which the solvate crystals crystallize out and the suspension is maintained at this temperature for further crystallization.

When inorganic solvents are used, the procedure may similarly be as follows: the perylimide I is dissolved at a suitable temperature in substantially anhydrous to highly concentrated solvent and the crystallization is initiated in step b1) by diluting the solvent with water or aqueous solutions of the solvent. Or the perylimide I is stirred directly for several hours in a less concentrated solvent, preferably at temperatures around room temperature, likewise resulting in the formation of solvate crystals.

This will now be illustrated in detail using the example of the particularly preferred solvent sulfuric acid. In the first variant, it is advisable to dissolve the perylimide I at approximately room temperature (approx. 20-30° C.) in about 96 to 100% by weight sulfuric acid, then to gradually reduce the sulfuric acid concentration by adding water or more dilute sulfuric acid (for example 20% by weight sulfuric acid) to about 70 to 93% by weight and thus effect the crystallization of a sulfate of the perylimide I. In the second variant, about 70 to 90% by weight sulfuric acid is used directly.

Depending on the molecular size of the solvent, the crystalline solvates which are obtained in step c) of the process according to the invention and are likewise according to the invention have a molar composition of solvent to perylimide I of 1:1 (for example in the case of xylene, N-methylpyrrolidone, methoxybenzene and dimethylacetamide solvates) or 2:1 (for example in the case of methylene chloride and acetic acid solvates). Despite the same gross composition, the crystalline phases may have different crystal structures. In the case of some of these solvates (for example in the case of methylene chloride and acetic acid solvates), the solvent molecules may leave the perylimide host lattice without its crystalline structure changing significantly. In such cases, nonstoichiometric binary phases of solvent and perylimide I may also be formed.

The exact composition of the sulfuric acid solvates generally cannot be determined, since the solvates rapidly lose sulfuric acid when isolated. However, characterization by X-ray powder diffractometry is just as possible as in the case of the solvates with organic solvents.

The solvent is then removed from the solvate crystals in step d), resulting substantially in the retention of the crystalline structures formed in step b) or else the formation of new crystalline phases. The solvent is advantageously removed by drying solvate crystals, optionally under reduced pressure and at elevated temperature. If desired, the solvate crystals may have been additionally treated (washed) before drying, with a solvent which itself does not form a solvate, preferably with water or mixtures of organic solvents with water.

The crystalline forms of the perylimides I obtained according to the invention may be characterized by X-ray powder diffractometry or by single crystal structural analysis. This resulted in the crystalline perylimides A to E which are likewise according to the invention being found, which are obtainable by crystallization from methylene chloride (perylimide A), acetic acid (perylimide B), sulfuric acid (perylimides C and D) and M-methylpyrrolidone/acetic acid (perylimide E). The X-ray powder diagrams of these perylimides are depicted in FIGS. 1 and 3 to 6.

BRIEF DESCRIPTION OF THE DRAWINGS

FIG. 1 illustrates the x-ray powder diagram of perylimide la in the crystalline form A.

FIG. 2 illustrates the x-ray powder diagram of an NMP-damp crystalline product.

FIG. 3 illustrates the x-ray powder diagram of perylimide la in the crystalline form B.

FIG. 4 illustrates the x-ray powder diagram of perylimide la in the crystalline form C.

FIG. 5 illustrates the x-ray powder diagram of perylimide la in the crystalline form D.

FIG. 6 illustrates the x-ray powder diagram of perylimide la in the crystalline form E.

The process according to the invention has a series of advantages which could not have been predicted. For instance, not only was it made easier to crystallize the perylimides I, but coarsely crystalline crystals were also formed which are easy to filter, can be washed without significant product loss and additionally have high purities of generally >90% (by-products formed in the synthesis such as N-monoalkylation products can be removed without any problem). The use of sulfuric acid as solvent generally allows the degree of purity to be further increased to >95% by additional removal of decarboxylation products occurring in the synthesis, so that, irrespective of the way in which the crude materials I used are synthesized, product qualities can be obtained in a simple manner which are otherwise only obtainable by chromatography. The crystals formed are notable not least for their high dissolution rates which allow them to be particularly readily incorporated into plastics.

Accordingly, the perylimides I obtained according to the invention, in particular the perylimides A to E, have outstanding suitability as fluorescent dyes for coloring organic and inorganic polymeric materials and also as emitter materials in electrooptical components, for example displays and emissive color filters, for which the perylimide A in particular is suitable owing to its marked solid state fluorescence.

EXAMPLES

Conversion of N,N'-bis(2,6-diisopropylphenyl)perylene-3,4:9,10-tetracarboximide (Perylimide Ia) in a form suitable for use as a fluorescent dye Example 1

6 g of the perylimide Ia were dissolved in 800 ml of boiling methylene chloride and stirred for a further 60 min at the boiling temperature of the solvent. After filtration under pressure via a G4 glass frit, the filtrate was stirred under reflux for a further 60 min and then cooled by heat exchange with the environment to room temperature (approx. 20° C.). A vacuum of approx. 50 kPa was then applied at this temperature to gradually remove methylene chloride until the first crystals formed. The mixture was then cooled to −20° C. After storing for one day at this temperature, the crystals formed were filtered off, washed with cold methylene chloride and dried at 20° C.

X-ray structural analysis at 203 K showed a solvate having 2 molecules of methylene chloride per molecule of perylimide Ia having the following crystallographic data: space group P $2_1$/n, Z=2, a=1003.2(2) pm, b=1907.8(6) pm, c=1156.3(2) pm, β=96.794(10)°, R1=0.1151, wR2=0.2308.

Complete removal of the methylene chloride under reduced pressure gave the perylimide Ia in the crystalline form A (perylimide A) having significant lines in the X-ray powder diagram (CuK$_\alpha$) at the following d values (FIG. 1): 10.2, 9.60, 8.17, 7.60, 7.07, 6.89, 6.02, 5.64, 4.89, 4.79, 4.63, 3.93, 3.81, 3.53 and 3.43 Å. Rietveld refinement of the powder diagram resulted in the following crystallographic data being obtained for the perylimide A: space group P $2_1$/c, Z=2, a=1207.3(3) pm, b=1918.3(5) pm, c=1433.1(4) pm, β=141.10(1)°, R1=0.1615, wR2=0.2041.

Example 2

10.1 g of a mixture of 6 parts of the perylimide Ia and 4 parts of N-(2,6-diisopropylphenyl)perylene-3,4-dicarboximide were dissolved in 1 200 ml of p-xylene in the heat of boiling. After filtration at this temperature via a G4 glass frit, the filtrate was cooled to room temperature and concentrated to half its volume at 20° C. by passing a gentle air stream over it. After formation of the first crystals, the vessel was sealed. The red rhombohedra formed after 8 d were filtered off and washed with a little cold petroleum ether.

No N-(2,6-diisopropylphenyl)perylene-3,4-dicarboximide could be detected in the crystals by chromatography, which shows that the process according to the invention makes it possible to effectively remove the decarboxylation products from crude materials of the perylimides I.

X-ray structural analysis showed a solvate of perylimide Ia with p-xylene in a molar ratio of 1:1 having the following crystallographic data: space group P ca$2_1$, a=1825.1(3) pm, b=830.9(1) pm, c=2988.9(5) pm, R1=0.0638, wR2=0.1682.

Example 3

A mixture of 3 g of the perylimide Ia and 30 ml of N-methylpyrrolidone (NMP) was stirred at 80° C. for 8 d. After cooling to 20° C., the resulting crystal slurry was filtered off and washed briefly with cold NMP.

The X-ray powder diagram (CuK$_\alpha$) of the NMP-damp crystalline product had significant lines at d values of 15.3, 8.36, 7.64, 7.36, 6.48, 5.95, 5.85, 5.65, 5.56, 5.10, 4.36, 4.14 and 3.87 Å (illustrated in FIG. 2). The comparison of the X-ray powder diagrams of Example 2 and Example 3 gave the isomorphicity of the two solvates.

The crystals dried under gentle conditions lost a total of 12.1% of their weight under thermal treatment at 201-218° C., which corresponds to the loss of 1 mol of NMP from a solvate of molar composition 1:1 (calc. 12.2% by weight).

Elemental analysis (% by weight calc./found): C: 78.6/78.2; H: 6.4/6.8; N: 5.2/5.2; O: 9.9/10.4.

Comparative Example C 6 g of the perylimide Ia were dissolved in 200 ml of NMP at 100° C.

After stirring for 20 minutes at this temperature, the solution was filtered at 100° C. and poured into 2 000 ml of a 1:1 mixture (v/v) of methanol and water within 5 min with vigorous stirring.

The red, voluminous precipitate which precipitated out was filtered off, washed with water and dried under reduced pressure at 100° C. for 24 h.

The X-ray powder diagram of the material obtained only showed 4 broad lines whose average d values (15.7, 6.95, 5.88, 3.47 Å) correspond to the molecular dimensions of the perylimide Ia and it therefore proved to be substantially X-ray-amorphous.

Example 4

A mixture of 2 g of the perylimide Ia and 50 ml of glacial acetic acid was stirred at room temperature for 14 h. The crystals were filtered off and separated into two halves.

One half was dried under air at room temperature. The X-ray powder diagram (CuK$_\alpha$) of the product dried in this way had significant lines at d values of 14.7, 8.64, 7.73, 7.27, 6.69, 6.14, 5.75, 5.68, 4.98, 4.54, 4.49, 4.35, 4.13 and 3.87 Å.

Thermal treatment at 115-196° C. resulted in the crystals dried under air losing a total of 13.8% of their weight, which corresponds to the loss of 2 mol of acetic acid from a solvate of the molar composition 2:1 (calc. 14.4%).

The other half was dried under reduced pressure at 80° C. This resulted in acetic acid-free perylimide Ia being obtained in the crystalline form B (perylimide B) having significant lines in the X-ray powder diagram (CuK$_\alpha$) at the following d values (FIG. 3): 15.3, 7.68, 7.32, 7.15, 5.99, 5.59, 5.33, 4.98, 4.24, 3.86 and 3.235 Å.

Example 5

3 g of the perylimide Ia were dissolved in 50 ml of methoxybenzene in the heat of boiling. The solution was initially cooled gradually to room temperature and then cooled further in an ice bath. The crystals were filtered off, washed with a little cold methoxybenzene and dried at room temperature and a pressure of 10 kPa for 24 h.

The X-ray powder diagram of the perylimide Ia present in the form of shiny platelets suggested that there was a mixture of different solvate phases of the molar composition 1:1. Grinding with a mortar resulted in a further change in the line positions, while the composition remained unchanged.

Elemental analysis (% by weight calc./found): C: 80.7/80.4; H: 6.2/6.1; N: 3.4/3.4; O: 9.8/9.7.

Example 6

2 g of the perylimide Ia were dissolved in 150 ml of dimethylacetamide in the heat of boiling. The solution was then gradually cooled to room temperature. After storing for three days at room temperature, the crystals were filtered off, washed with a little cold dimethylacetamide and dried at room temperature and a pressure of 10 kPa for 24 h.

Elemental analysis of the perylimide Ia present in the form of shiny platelets showed a solvate of molar composition 1:1 whose X-ray powder diagram (CuK$_\alpha$) showed significant lines at the following d values: 15.2, 7.60, 7.35, 6.46, 5.07, 4.34, 3.87 and 3.47 Å.

Elemental analysis (% by weight calc./found): C: 78.3/77.9; H: 6.4/6.4; N: 5.3/5.4.

Example 7

2 g of the perylimide Ia were dissolved in 40 g of oleum (100% by weight sulfuric acid) at room temperature. After stirring for 15 minutes, the sulfuric acid concentration was reduced to 82% by weight by metering in a total of 10.2 ml of 20% by weight sulfuric acid within 120 min while maintaining a temperature of 25-30° C. The resulting crystal suspension was stirred at 20° C. for 48 h and then filtered through a G4 glas frit.

The resulting red crystals which were damp with sulfuric acid were characterized with exclusion of air by a Debye-Scherrer diagram. There were significant lines at the following d values: 10.24, 7.80, 6.77, 6.24, 5.61, 5.34, 4.58, 4.42, 4.01, 3.805 and 3.415 Å.

A similar experimental procedure and the setting of end sulfuric acid concentrations of 80% by weight, 84% by weight and 86% by weight resulted in crystals having identical X-ray powder diagrams being obtained.

Example 8

A mixture of 2 g of the perylimide Ia and 40 g of 84% by weight sulfuric acid was stirred at 20° C. for 48 h. The resulting crystal slurry was filtered through a G4 glass frit.

The resulting red crystals which were damp with sulfuric acid were characterized with exclusion of air by a Debye-Scherrer diagram (CuK$_\alpha$). There were significant lines at the following d values: 10.24, 7.80, 6.77, 6.24, 5.61, 5.34, 4.58, 4.42, 4.01, 3.805 and 3.415 Å.

A similar experimental procedure and the setting of end sulfuric acid concentrations of 86% by weight and 90% by weight resulted in crystals having identical X-ray powder diagrams being obtained.

Example 9

A mixture of 2 g of the perylimide Ia and 40 g of 82% by weight sulfuric acid was stirred at 20° C. for 48 h. The resulting crystal slurry was filtered through a G4 glass frit.

The resulting red crystals which were damp with sulfuric acid were characterized with exclusion of air by a Debye- Scherrer diagram (CuK$_\alpha$). There were significant lines at the following d values: 9.74, 9.27, 7.73, 7.13, 5.80, 4.7 and 4.11 Å.

A similar experimental procedure and the setting of end sulfuric acid concentrations of 80% by weight resulted in crystals having identical X-ray powder diagrams being obtained.

Example 10

12.5 g of the perylimide Ia were dissolved in 250 g of oleum (100% by weight sulfuric acid) at room temperature. After stirring for 15 minutes, the sulfuric acid concentration was reduced to 92.4% by weight by metering in a total of 23 ml of 20% by weight sulfuric acid within 300 min while maintaining a temperature of 25-30° C. The resulting crystal suspension was stirred for 4 h and then filtered through a G4 glass frit. The crystal slurry was spread out thinly and hydrolyzed under air for 12 h. During this time, the sulfuric acid took up further water. After stirring the crystal suspension in 500 ml of water, the crystals were filtered off, washed to neutrality with water and dried to constant weight at 80° C.

The crystalline form C of the perylimide Ia (perylimide C) was obtained in the form of dark orange-colored crystals having significant lines in the X-ray powder diagram (CuK$_\alpha$) at the following d values (FIG. 4): 10.67, 9.88, 9.36, 7.82, 7.16, 6.89, 5.74, 5.49, 4.68, 4.085, 3.354 and 3.252 Å.

Example 11

9.6 kg of the perylimide Ia were introduced into 144 kg of concentrated sulfuric acid (96% by weight) with vigorous stirring within 20 min. The stirring was continued for 90 min at an internal temperature of 28° C. until complete dissolution. The sulfuric acid concentration was then reduced to 92% by weight by metering in 6.2 kg of water within 240 min. The resulting crystal slurry was filtered off, washed three times with 10 l of 87% by weight sulfuric acid and then stirred in 70 l of water at 50-60° C. for 60 min. The crystal slurry was filtered off, washed to neutrality with water and dried to constant weight at 100° C.

The crystalline form D of the perylimide Ia (perylimide D) was obtained in the form of dark orange-colored crystals having significant lines in the X-ray powder diagram (CuK$_\alpha$) at the following d values (FIG. 5): 9.7, 8.6, 7.85, 6.88, 4.83, 4.13 and 3.81 Å.

Example 12

23 g of the 1:1 solvate of the perylimide Ia with NMP (Example 4) were stirred under reflux in 146 g of glacial acetic acid for 15 h. The crystal suspension was allowed to cool to 70-80° C. The crystal slurry was then filtered off, and washed initially with 32 g of glacial acetic acid at 60-70° C., then with 140 ml of water and afterwards with 500 ml of 2% by weight ammonia solution. After washing to neutrality with water and driving out the water with ethanol, the filter cake was dried at 100° C.

The crystalline form E of the perylimide Ia (perylimide E) was obtained in the form of orange-colored crystals having significant lines in the X-ray powder diagram (CuK$_\alpha$) at the following d values (FIG. 6): 15.2, 14.7, 8.04, 7.76, 7.36, 6.43, 5.59, 4.99, 4.25, 4.14 and 3.863 Å.

Examples 13 to 21

2 g of the perylimide Ia were dissolved in x ml of the solvent L at T° C. Undissolved starting material was filtered off at T° C. The filtrates were cooled to room temperature within t h. The orange to orange-red crystals formed were filtered off and dried under reduced pressure at room temperature.

Further details of these experiments and also the d values of the significant lines in the particular X-ray powder diagrams are compiled in the following table.

TABLE

| Ex. | x [ml] | L | T [° C.] | t [h] | d values [Å] |
|---|---|---|---|---|---|
| 13 | 100 | Nitrobenzene | 150 | 4 | 20.4, 11.8, 8.32, 7.81, 7.20, 6.80, 6.49, 6.14, 5.408, 4.947, 4.083, 3.927 |
| 14 | 100 | Phenyl glycol | 150 | 4 | 16.1, 14.2, 10.3, 8.48, 7.61, 6.793, 5.180, 4.237 |
| 15 | 100 | n-Butanol | 90 | 2 | 14.7, 8.26, 7.47, 6.44, 5.633, 4.879, 4.240, 3.923, 3.842, 3.743 |
| 16 | 150 | Methyl glycol | 60 | 2 | 14.7, 14.45, 7.45, 7.31, 6.40, 4.834, 4.212, 3.894 |
| 17 | 100 | Cyclohexanol | 80 | 2 | 11.8, 8.4, 7.17, 6.48, 5.89, 5.44, 5.284, 4.68, 4.49, 3.55 |
| 18 | 100 | Chlorobenzene | 120 | 6 | 20.5, 13.6, 11.8, 7.75, 7.20, 6.84, 6.58, 6.19, 4.53, 3.956 |
| 19 | 50 | Benzyl alcohol | 130 | 6 | 15.6, 9.62, 9.28, 8.296, 7.973, 6.369, 6.045, 5.155, 4.462, 4.157, 3.888, 3.353 |
| 20 | 150 | Butyl glycol | 130 | 4 | 7.94, 7.232, 7.12, 5.92, 4.96, 4.79, 4.62, 3.986, 3.63, 3.555 |
| 21 | 75 | Methyl benzoate | 130 | 4 | 15.2, 14.8, 14.4, 8.86, 7.82, 6.84, 6.75, 5.8, 5.00, 4.42 |

We claim:
1. A process for converting a perylene-3,4:9,10-tetracarboxylic diimide of formula I

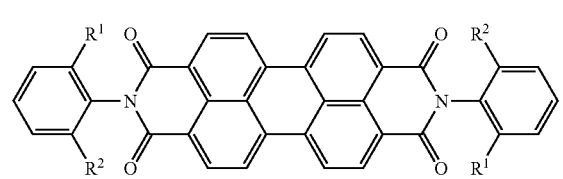

to a fluorescent dye,
wherein $R^1$ and $R^2$ are each unbranched, branched or cyclic $C_1$-$C_8$-alkyl, said process comprising:
  a) dissolving said perylene-3,4:9,10-tetracarboxylic diimide in sulfuric acid as a solvent, said solvent having a molecular volume of $\leq 230$ Å$^3$, at a first temperature of from 20 to 60° C. to obtain a solution,
  b) cooling said solution or said suspension obtained in step a) by a process consisting of b1),
    b1) cooling said solution obtained in step a) to a second temperature at or below the crystallization temperature of said perylene-3,4:9,10-tetracarboxlyic diimide of formula I and, adding water or dilute aqueous solutions of the solvent until the first crystals form, wherein further crystallization continues in said solution at said second temperature after the first crystals form,
c) isolating said one or more solvate crystals formed in step b) and
d) then removing said solvent from said one or more solvate crystals.

2. The process as claimed in claim 1, wherein the obtained fluorescent dye has a purity of greater than 95%.

3. The process as claimed in claim 1, wherein the first temperature of step a) is 20 to 30° C.

* * * * *